M. A. BRADY.
SINK LINING.
APPLICATION FILED AUG. 1, 1921.
1,406,147.
Patented Feb. 7, 1922.
3 SHEETS—SHEET 1.
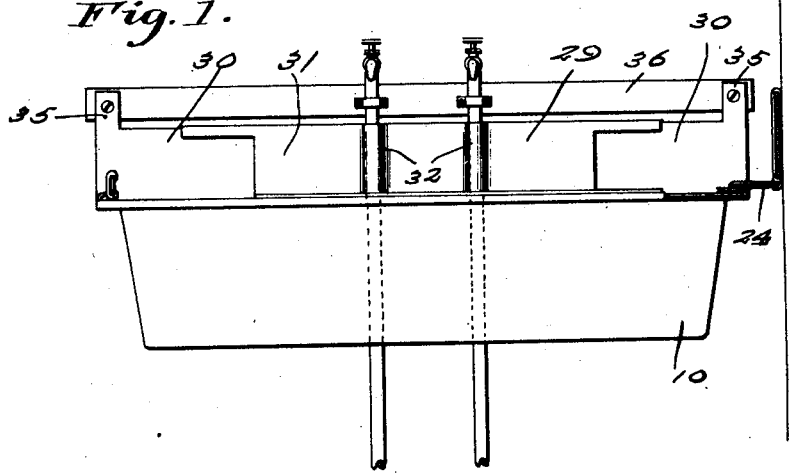
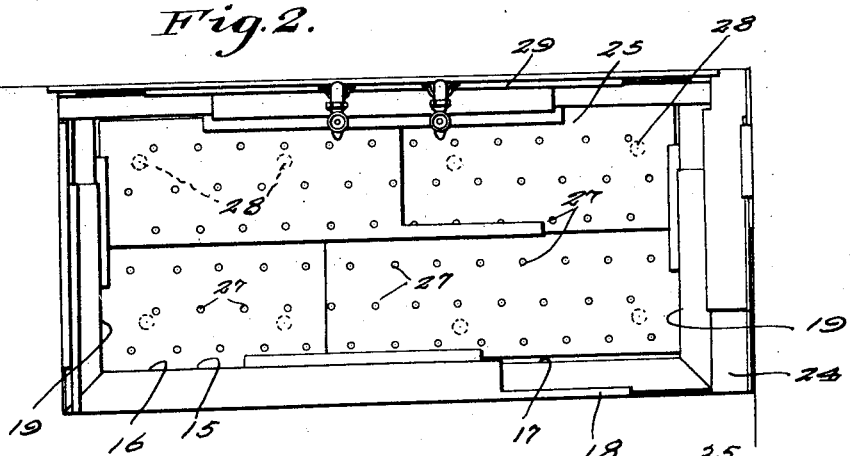
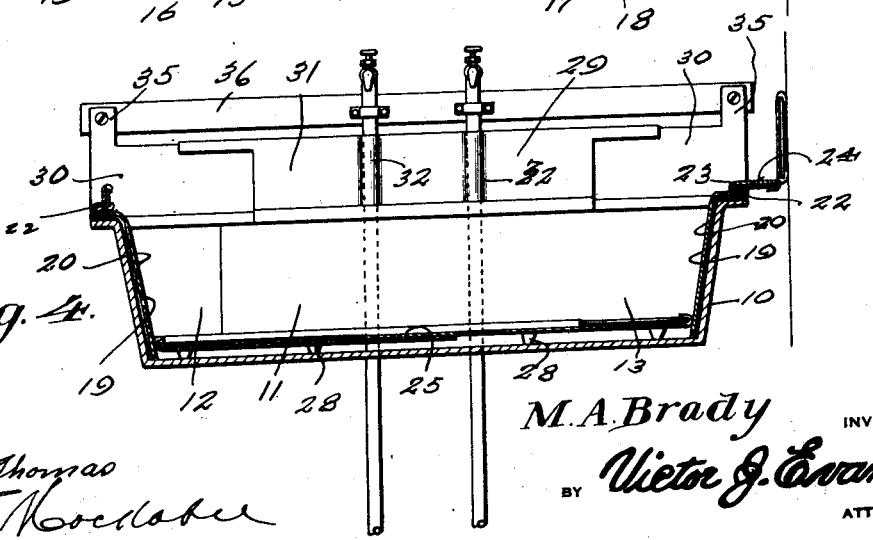
M. A. Brady INVENTOR

M. A. BRADY.
SINK LINING.
APPLICATION FILED AUG. 1, 1921.

1,406,147.

Patented Feb. 7, 1922.
3 SHEETS—SHEET 2.

M. A. Brady INVENTOR

BY Victor J. Evans ATTORNEY

WITNESSES

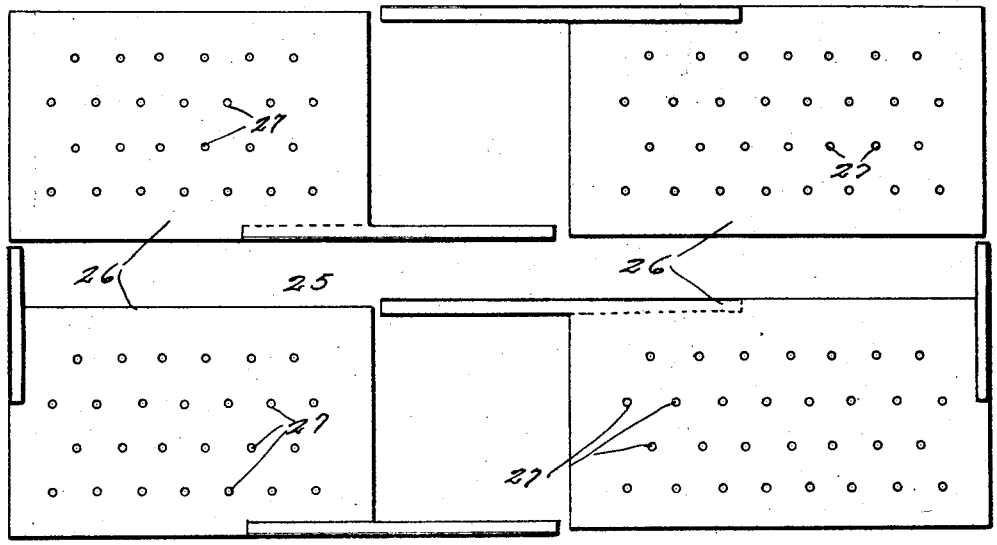
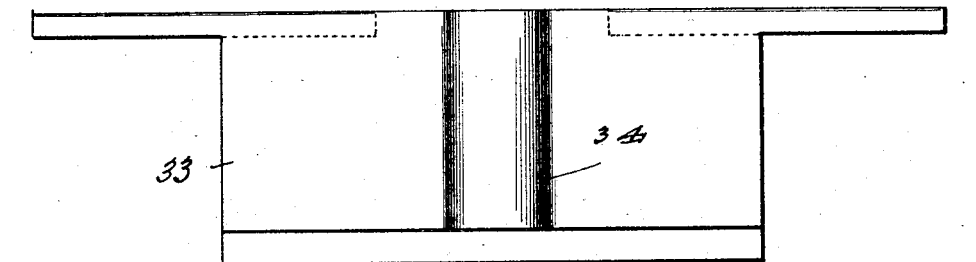
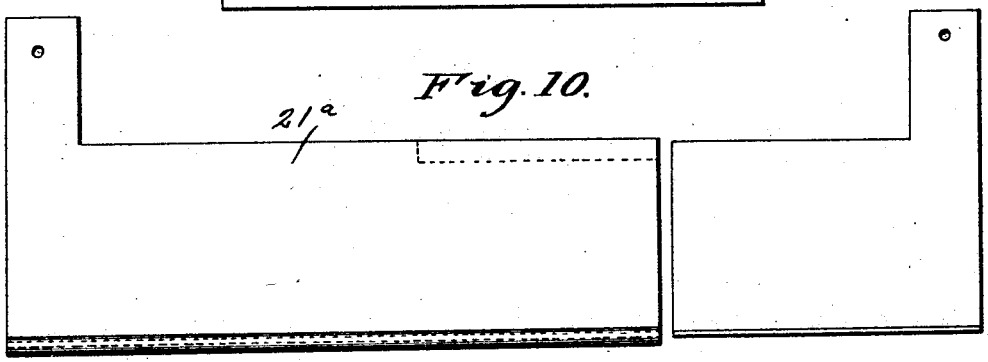

UNITED STATES PATENT OFFICE.

MARY A. BRADY, OF NEW YORK, N. Y.

SINK LINING.

1,406,147. Specification of Letters Patent. Patented Feb. 7, 1922.

Application filed August 1, 1921. Serial No. 488,937.

*To all whom it may concern:*

Be it known that I, MARY A. BRADY, a citizen of the United States, residing at New York, in the county of New York and State of New York, have invented new and useful Improvements in Sink Linings, of which the following is a specification.

This invention relates to improvements in kitchen sinks and has for an object the provision of a removable lining which may be placed within a sink of ordinary construction for the purpose of improving its appearance and permitting the same to be kept in a neat and attractive manner.

Another object of the invention is the provision of a sink lining which is adjustable so as to permit of its use in sinks of different sizes, the construction being such that the lining may be readily positioned within the sink without the use of a skilled workman.

A further object is the provision of a sink lining of this character which is of sectional formation and which includes removable sections which may be extended above the upper edge of the sink to provide a splash board, the sections being interchangeable so as to permit of the use of these splash boards with sinks supplied with one or more faucets.

A still further object of the invention is the provision of a sink lining which is preferably formed of porcelain plates which are capable of relative adjustment to fit sinks of different sizes, the construction being simple so as to permit of the ready application of the lining.

With the above and other objects in view, the invention further includes the following novel features and details of construction, to be hereinafter more fully described, illustrated in the accompanying drawings and pointed out in the appended claims.

In the drawings:—

Figure 1 is a front elevation of the sink with the invention applied thereto.

Figure 2 is a top plan view of the same.

Figure 4 is a longitudinal section.

Figure 8 is a like view of the bottom or drain plate.

Figure 9 is a detail view of one section of the splash board showing the section constructed for use for a single offset as used in connection with the sink.

Figure 10 is a detail view of a modified form of intermediate section of the splash plate.

Figure 3:
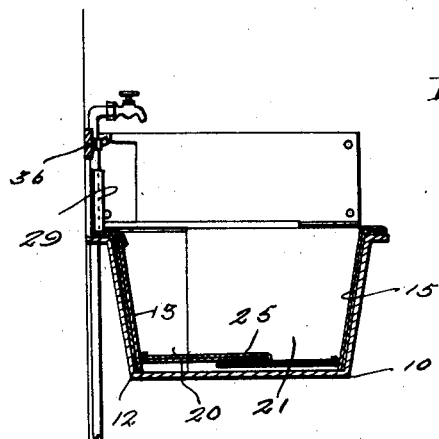
Figure 3 is a transverse section.
Figure 5:
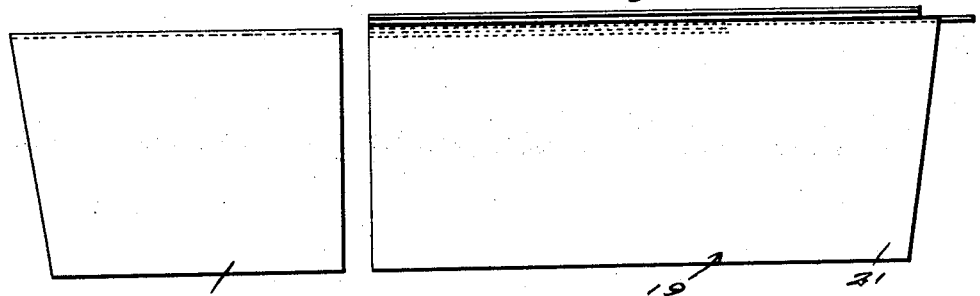
Figure 5 is a detail view of one of the side plates of the sink lining showing the sections separated.
Figure 6:
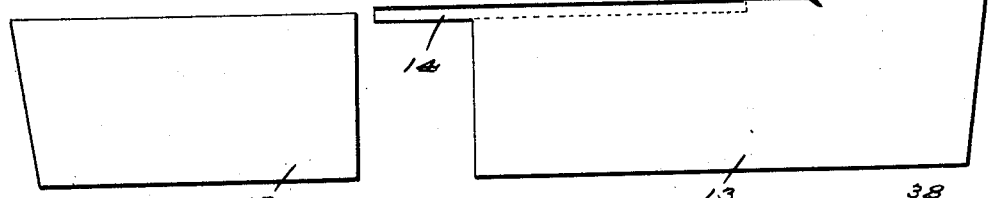
Figure 6 is a similar view of the back plate.
Figure 7:
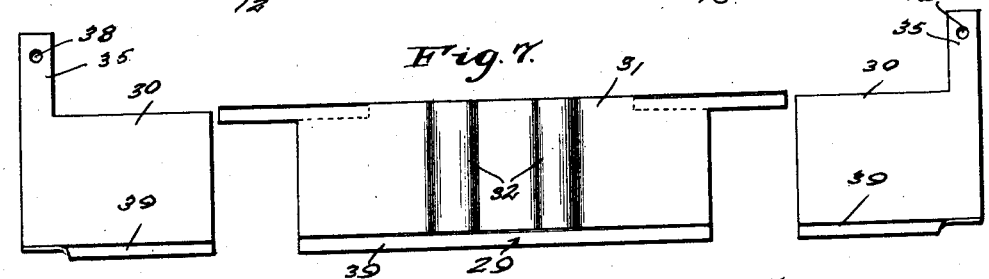
Figure 7 is a like view of the splash plate.

Referring in detail to the drawings, wherein like characters of reference denote corresponding parts, the reference character 10 indicates a sink of the usual iron structure. Sinks of this character become unsightly and require frequent and laborious cleaning, which, however does little to the appearance of the sink.

The present invention has for its object the provision of a removable and adjustable lining which is preferably formed of sectional porcelain plates, which may be adjusted to fit sinks of different sizes. For this purpose there is provided a back plate 11 which comprises sections 12 and 13, one of said sections having extending from its upper edge an arm 14 which is provided with a groove to slidingly receive the adjacent upper edge of the other section so that the length of the back plate may be regulated in conformity to the length of the sink.

The inner front portion of the sink is covered by a front plate 15, which includes sections 16 and 17, one of which is provided with a grooved extending arm 18, similar to the arm 14 so as to slidingly receive the upper edge of the other section of the front plate to permit of proper adjustment. Each end of the sink is covered by an end plate 19, each of which comprise adjustable sections 20 and 21 which are connected in a manner similar to the sections of the back and front plates. In addition these end plates 19 are provided along their upper edges with longitudinally extending grooves 22 which slidingly receive tongues 23 formed on end strips 24. These end strips are designed to provide splash plates for the protection of the wall when the end of the sink is positioned sufficiently close to have the wall injured by splashings from the sink. These end strips are interchangeable and may be applied to either end of the sink, or one may be used at each end, as desired.

The front, back and side plates are adjusted in position and are held in place by a bottom plate 25 whose edges abut the adjacent faces of the front, back and end plates and serve to hold the latter in position. This bottom plate is formed of adjustable sections 26 which are perforated as shown at 27 so as to permit of drainage through the plate. This bottom plate is further provided with legs 28 which extend downwardly and serve to space the place 27 from the bottom of the sink. This not only permits of free drainage beneath the plate 25 but spaces the latter slightly from the lower edges of the front, back and end plates and thus more securely hold the latter in position.

The invention further includes a rear splash plate which is designed to extend upward from the back of the sink against the adjacent wall. The rear splash plate is designated generally at 29 and comprises outer sections 30 which are connected by an intermediate section 31. This last mentioned section is provided with substantially semi-circular offset portions 32 which receive the pipes for supplying hot and cold water to the sink. If desired a section 33 having a single pipe receiving offset portion 34 as shown in Figure 9 of the drawings may be substituted for the section 31.

Extending upwardly from each of the outer sections 30 is an arm 35 and connecting the arms of each of the outer sections is a plate section 36, the latter being provided with openings 37 for register with openings 38 formed in the arms 35 so as to permit of the passage of bolts or other suitable fastening devices to removably hold the sections together. The section 36 is designed to be placed behind the water supply pipes and serves to protect the wall for an appreciable distance above the top of the sink.

It is preferred to provide the lower edges of the sections 20, 31 and 33 of the rear splash plate with offset flanges 39 which are adapted to rest along the upper edge of the rear portion of the sink and to act to prevent water from running down the rear splash plate behind the sink.

In Figure 10 there is illustrated a modified form of intermediate section of the splash plate. This section is indicated at 21ᵃ and is designed for use where the hot and cold water pipes are positioned behind the sink.

The invention is susceptible of various changes in its form, proportions and minor details of construction and the right is herein reserved to make such changes as properly fall within the scope of the appended claims.

Having described the invention what is claimed is:—

1. A sink lining comprising front, back and side walls, a separate perforated bottom having its edges in contacting engagement with the front, back and side walls, means extending downwardly from the bottom to space the latter above the bottom of the sink, a sectional splash plate and a drip flange extending along the lower edge of the splash plate for engagement over the rear wall of the lining.

2. A sink lining comprising front, back and side walls, a separate perforated bottom having its edges in contacting engagement with the front, back and side walls, means extending downwardly from the bottom to space the latter above the bottom of the sink, a sectional splash plate, said plate including outer sections and an inner pipe embracing section and means for adjustably securing the sections together.

3. A sink lining comprising front, back and side walls, a separate perforated bottom having its edges in contacting engagement with the front, back and side walls, means extending downwardly from the bottom to space the latter above the bottom of the sink, splash plates and slidable means for removably securing the splash plates to the end walls of the lining.

4. A sink lining comprising a front, back and side walls, a separate sectional perforated bottom in contacting engagement with the front, back and side walls and means extending from one edge of each section of the perforated bottom whereby the sections may be adjusted to regulate the size of the bottom.

In testimony whereof I affix my signature.

MARY A. BRADY.